US006764526B2

(12) United States Patent
Freytag et al.

(10) Patent No.: US 6,764,526 B2
(45) Date of Patent: Jul. 20, 2004

(54) DRY AIR FILTER FOR COMBUSION ENGINES OF VEHICLES

(75) Inventors: Erich Freytag, Sachsenried (DE); Gerd Rathke, Marktoberdorf (DE); Wolfgang Strodel, Fussen (DE)

(73) Assignee: Agco GmbH & Co., Marktoberdorf (DE)

( * ) Notice: Subject to any disclaimer, the term of this patent is extended or adjusted under 35 U.S.C. 154(b) by 13 days.

(21) Appl. No.: 10/269,829

(22) Filed: Oct. 11, 2002

(65) Prior Publication Data

US 2003/0084652 A1 May 8, 2003

(30) Foreign Application Priority Data

Oct. 26, 2001 (GB) ............................................. 0125696

(51) Int. Cl.[7] .......................... B01D 45/18; B01D 46/48

(52) U.S. Cl. .......................... 55/385.3; 55/431; 55/432; 55/468

(58) Field of Search ............................ 55/385.1, 385.3, 55/431, 432, 468, 482

(56) References Cited

U.S. PATENT DOCUMENTS 1,591,677 A * 7/1926 Garner ........................ 55/431
2,391,863 A * 1/1946 Bowen ........................ 96/372
3,165,390 A * 1/1965 Parken et al. ................. 55/431
3,507,098 A * 4/1970 Veres et al. ................... 96/409
3,737,074 A * 6/1973 Davis ......................... 406/171
3,874,738 A * 4/1975 Winkler et al. ............. 406/109
3,884,658 A 5/1975 Roach ......................... 55/315
4,148,849 A * 4/1979 Steiner ...................... 55/385.1
4,190,014 A * 2/1980 Jenkins et al. .............. 116/266
4,772,299 A * 9/1988 Bogusz ...................... 55/385.3
4,874,408 A * 10/1989 Overby ........................ 96/408
5,509,947 A * 4/1996 Burton ........................ 96/383
5,720,788 A * 2/1998 Puckett et al. ................ 55/337
6,585,789 B2 * 7/2003 Dippman et al. ............. 55/318

* cited by examiner

*Primary Examiner*—Robert H. Spitzer
(74) *Attorney, Agent, or Firm*—MacMillan, Sobanski & Todd, LLC

(57) ABSTRACT

A dry air filter for combustion engines of commercial vehicles with a device to produce compressed air, whereby the dry air filter (4) consisting of a filter housing (5) containing a filter cartridge (7) and a dust preliminary filtering stage (6), with an exhaust (8) for the dust discharged from the preliminary filtering stage which has a nozzle shaped section in which compressed air that is produced is blown through a conduit in the direction of the free opening by an ejector effect. In order that the air filter is easier to service and maintain, the compressed air is fed over a ring slot (28) into the exhaust (8) and is blown in the direction of the open outlet (21) for the purpose of creating an ejector effect to keep the exhaust free from dust. Compressed air is blown through the exhaust so that blockages cannot build up there nor in the area of the preliminary filtering stage. Specific, regular supervision of this area therefore becomes necessary.

10 Claims, 3 Drawing Sheets

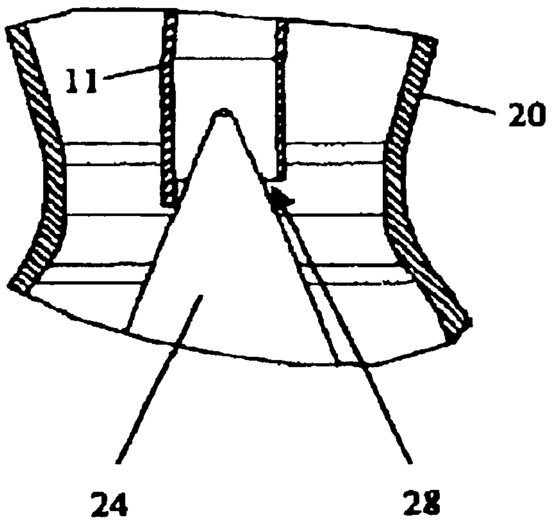
Fig. 3
Fig. 4
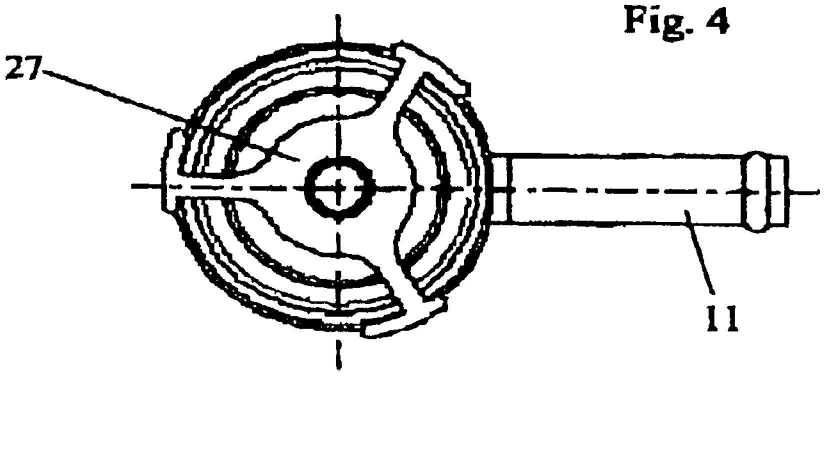

DRY AIR FILTER FOR COMBUSTION ENGINES OF VEHICLES

BACKGROUND OF THE INVENTION

The invention concerns a dry air filter for combustion engines of vehicles with a device to produce compressed air, whereby the dry air filter consists of a filter housing containing a filter cartridge and a dust preliminary filtering stage, with an exhaust for the dust discharged from the preliminary filtering stage, which has a nozzle shaped section into which compressed air that is produced is blown through a conduit in the direction of the free opening by means of an ejector effect.

The task of the invention concerns designing a dry air filter in such a way that it ensures that proper discharge through the exhaust in all conditions of dust that has collected in the dust preliminary filtering stage.

According to an aspect of the invention, there is provided a dry air filter including a ring slot that is realized by producing recesses separated by ridges in the rim of the outlet of the conduit, and a conical insert which engages with the outlet to define the ring slots.

A piece abuts the ridges by means of the force of an elastic component (member), and allows the desired width of the ring slot to be maintained in spite of the technical production inaccuracies of the individual parts.

Various objects and advantages of this invention will become apparent to those skilled in the art from the following detailed description of the preferred embodiment, when read in light of the accompanying drawings.

BRIEF DESCRIPTION OF THE DRAWINGS

FIG. 3 is the individual piece X in FIG. 2 at a larger scale.

FIG. 4 is a view of the outlet orifice of the exhaust.

DETAILED DESCRIPTION OF THE PREFERRED EMBODIMENT

Figure 1:
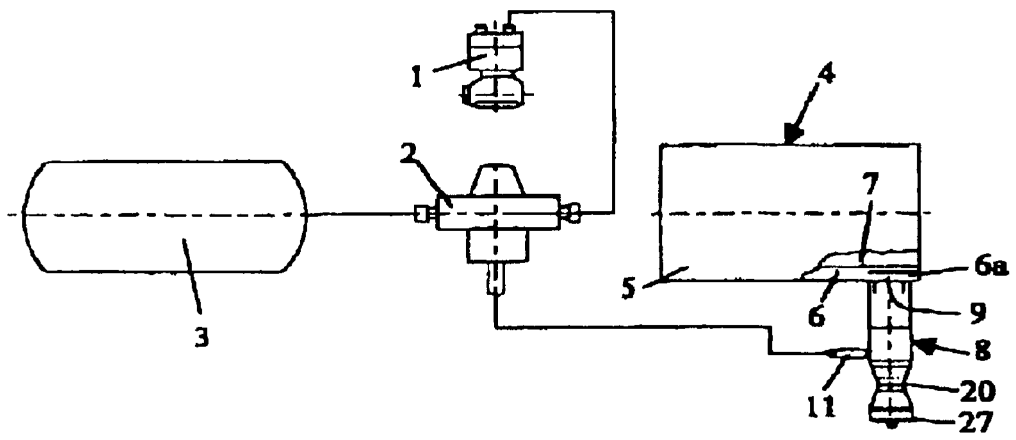
FIG. 1 is a schematic representation of an air filter and a device for producing compressed air.

A commercial vehicle (which is not shown for reasons of simplicity) is fitted with a device as shown in FIG. 1 for the production and storage of compressed air, which, for example, is used to activate the compressed air brakes. The device consists of a compressor 1 which is continuously operated by the drive engine and which loads the compressed air through a pressure limiting valve 2 into a compressed air container 3, from which the compressed air is conveyed as and when required—for example for the brakes. If the prescribed pressure in the compressed air container 3 is exceeded then the pressure-limiting valve 2 releases the unnecessary compressed air.

An already familiar dry air filter 4 cleans the combustible air from the drive engine of the vehicle. The filter housing 5 of this dry air filter 4 contains a dust preliminary filtering stage 6 and a filter cartridge 7 for the purposes of fine-cleaning the combustible air. As well as an inlet (not shown here) and an outlet for the combustible air, the filter housing 5 shows an outlet 8 for the dust separated at the preliminary filtering stage 6. The dust arrives in the outlet 8 from the stabilizing zone 6*a* of the preliminary filtering stage 6 through an opening 9 in the filter housing 5.

Figure 2:
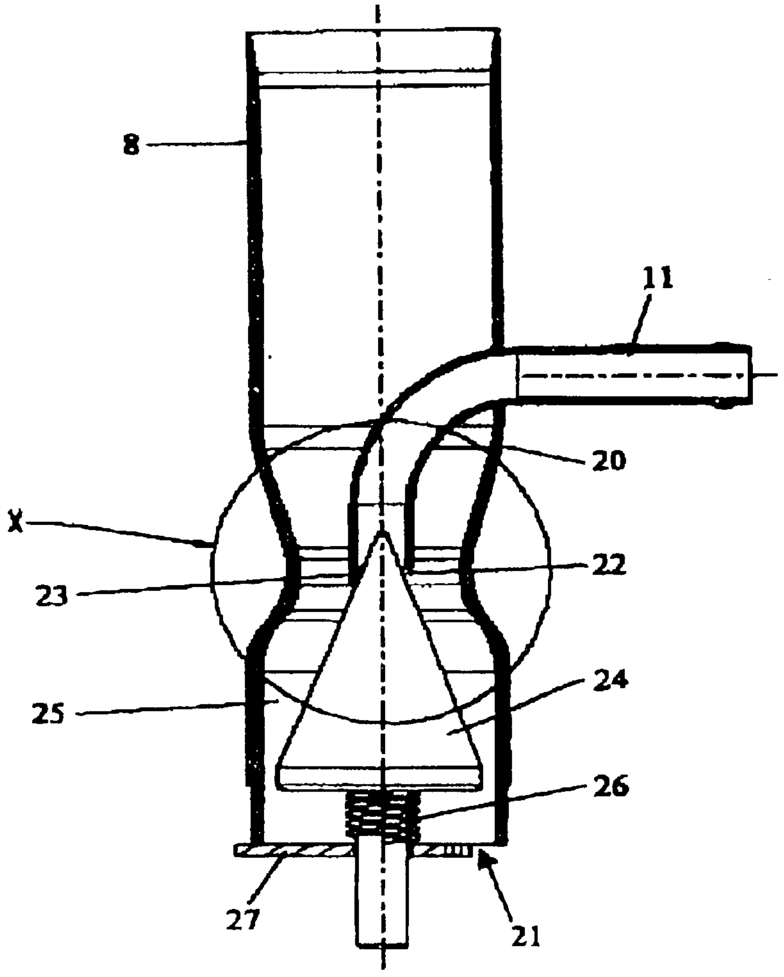
FIG. 2 is a cross-section of the exhaust.
Figure 5:
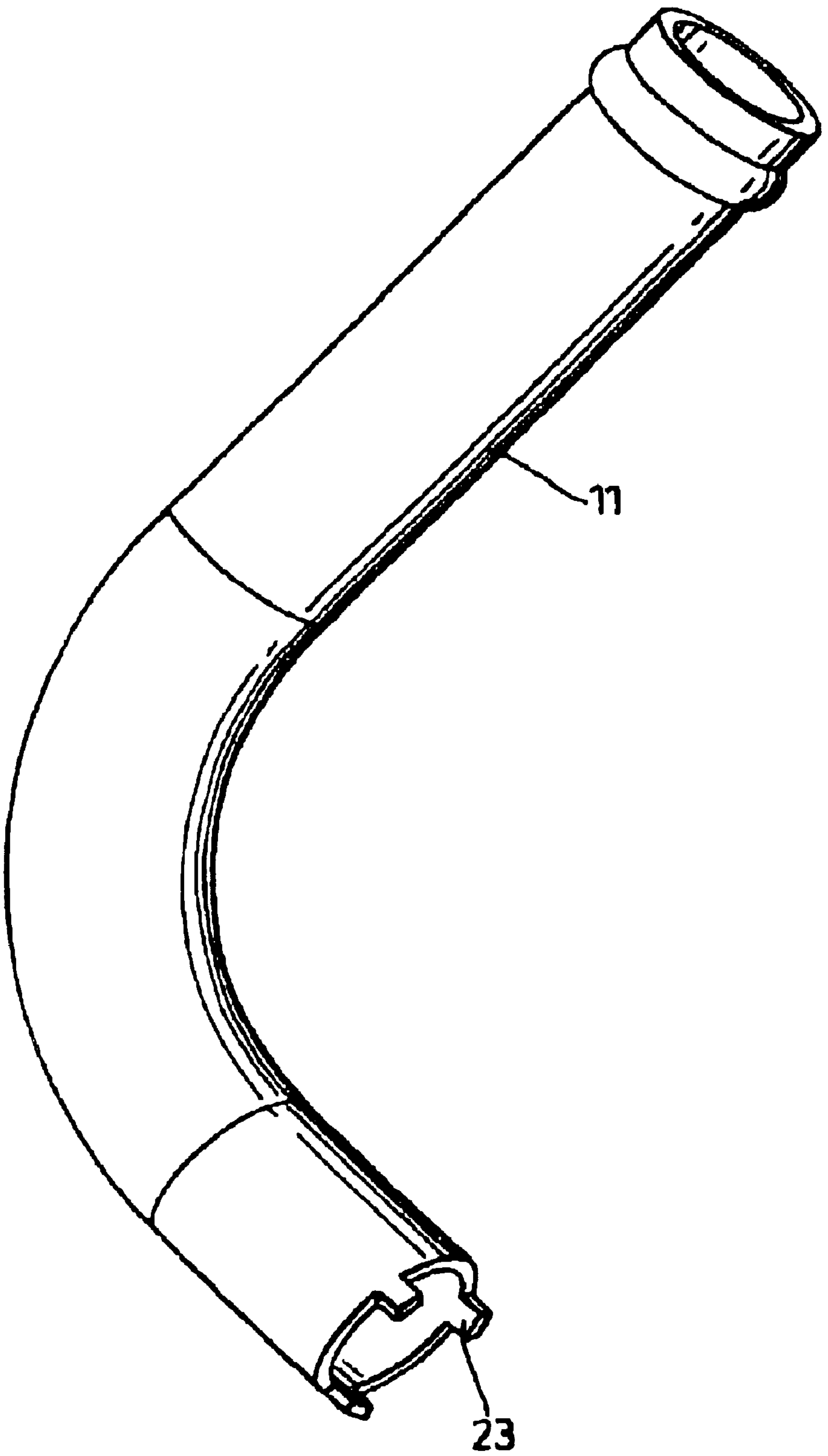
FIG. 5 is a view of the conduit 11.

As can be seen in FIGS. 2 through 4, the outlet 8 consists of a short pipe with a nozzle shaped section 20 and an open outlet orifice 21. Above the nozzle shaped section 20, a pressure tight conduit 11 is fed through the wall of the exhaust 8 that concentrically opens out in the narrowest profile of the nozzle shaped section 20. The mouth rim of the opening of the conduit 11 shows the recesses 22 that extend in a circumferential direction, which are kept at a predetermined distance from each other by ridges 23 that are evenly distributed along the periphery of conduit 11. A conical piece 24 is located concentrically on the inside of the part of the nozzle shaped section 20. The outer surfaces of this run largely parallel to the outer surfaces of the surrounding nozzle shaped section 20 to define an annulus 25 therebetween.

The insert 24 more or less closes the opening of the conduit 11 by means of its outer surfaces positioned next to the ridges 23 by the force of compression spring 26 located between the insert 24 and the three arm support bracket 27 attached to outlet 8 to provide outlet orifices 21. Only the ring slot 28 remains open, the dimensions of which are determined by the dimensions of the recesses.

In order to achieve a high underpressure with the aid of an injector effect into the area of the dust preliminary filtering stage 6, thereby enabling improved removal of the separated dust, compressed air is blown over the conduit 11 and the ring slot 28 in the direction of the outlet orifice 21 in the exhaust. The cross section of the annulus 25 and the ring slot 28 are dependent on the volume of the compressed air and are positioned in such a way that the residual annular air flow in the ring slot 28 is forced in the direction of the outlet orifice 21.

What is claimed is:

1. A dry air filter for combustion engines of commercial vehicles with a device to produce compressed air, the dry air filter comprising:

a filter housing containing a filter cartridge and a dust preliminary filtering stage, and an exhaust for dust discharged from the dust preliminary filtering stage, the exhaust having a nozzle shaped section into which compressed air is blown through a conduit in the direction of an open outlet orifice of the exhaust by an ejector effect, wherein the conduit opens out at the narrowest point of the nozzle shaped section, and wherein the conduit includes a ring slot in an outlet area of the conduit so as to create an annular flow of compressed air, and wherein a conical insert is mounted in the part of the nozzle shaped section that is facing the open outlet orifice of the exhaust, the outer surfaces of which run at least closely parallel to the inner surfaces of the nozzle-shaped section and together with this forms an annulus to provide an annular flow of compressed air.

2. The dry air filter according claim 1, wherein the outlet area of the conduit has recesses that are separated from each other by ridges, the conical insert co-operating with the ridges to define the size of the ring slot.

3. The dry air filter according to claim 2, wherein the position of the conical insert in the nozzle shaped section is adjustable.

4. The dry air filter according to claim 2, wherein the insert abuts the ridges under the force of an elastic component.

5. The dry air filter according to claim 4, wherein the elastic component is mounted between the base of the conical insert and a support bracket attached to the exhaust.

6. A vehicle comprising:

an air compressor, and a combustion engine, said combustion engine including a dry air filter comprising a filter housing containing a filter cartridge and a dust preliminary filtering stage, an exhaust for dust discharged from the dust preliminary filtering stage, the exhaust having a nozzle shaped section into which compressed air is blown from the air compressor through a conduit in the direction of an open outlet orifice of the exhaust by an ejector effect, wherein the conduit opens out at the narrowest point of the nozzle shaped section, and wherein the conduit includes a ring slot in an outlet area of the conduit so as to create an annular flow of compressed air, and wherein a conical insert is mounted in the part of the nozzle shaped section that is facing the open outlet orifice of the exhaust, the outer surfaces of which run at least closely parallel to the inner surfaces of the nozzle-shaped section and together with this forms an annulus to provide an annular flow of compressed air.

7. The vehicle according to claim 6, wherein the outlet area of the conduit has recesses that are separated from each other by ridges, the conical insert co-operating with the ridges to define the size of the ring slot.

8. The vehicle according to claim 7, wherein the position of the conical insert in the nozzle shaped section is adjustable.

9. The vehicle according to claim 7, wherein the insert abuts the ridges under the force of an elastic component.

10. The vehicle according to claim 9, wherein the elastic component is mounted between the base of the conical insert and a support bracket attached to the exhaust.

* * * * *